C. W. STARK.
WHEEL SCRAPER.
APPLICATION FILED MAY 26, 1908.
913,576.
Patented Feb. 23, 1909.
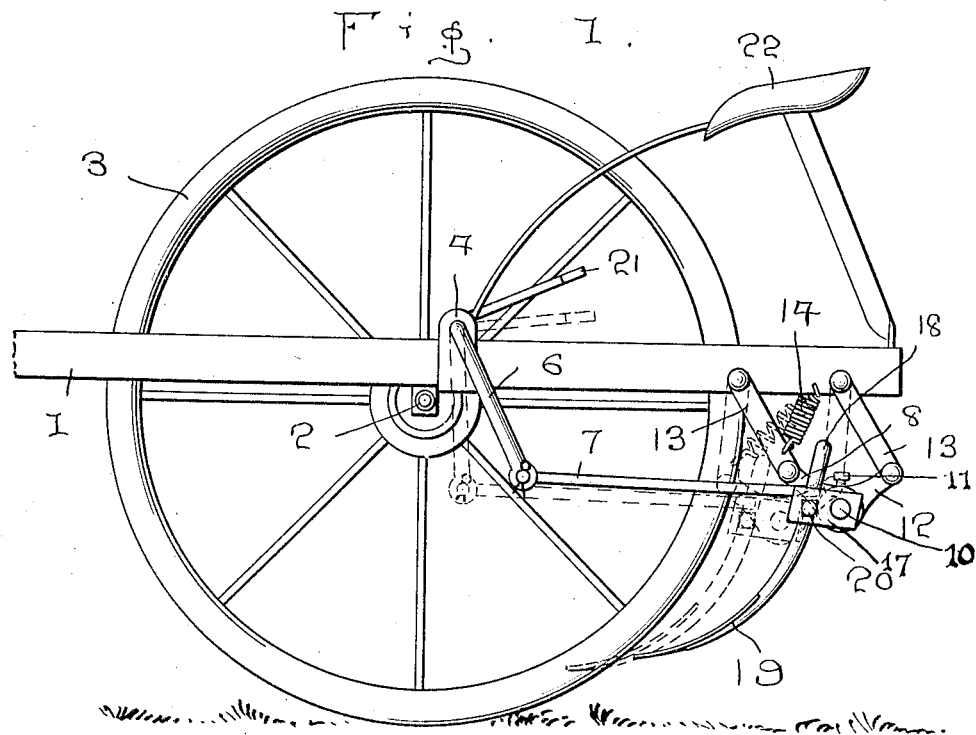
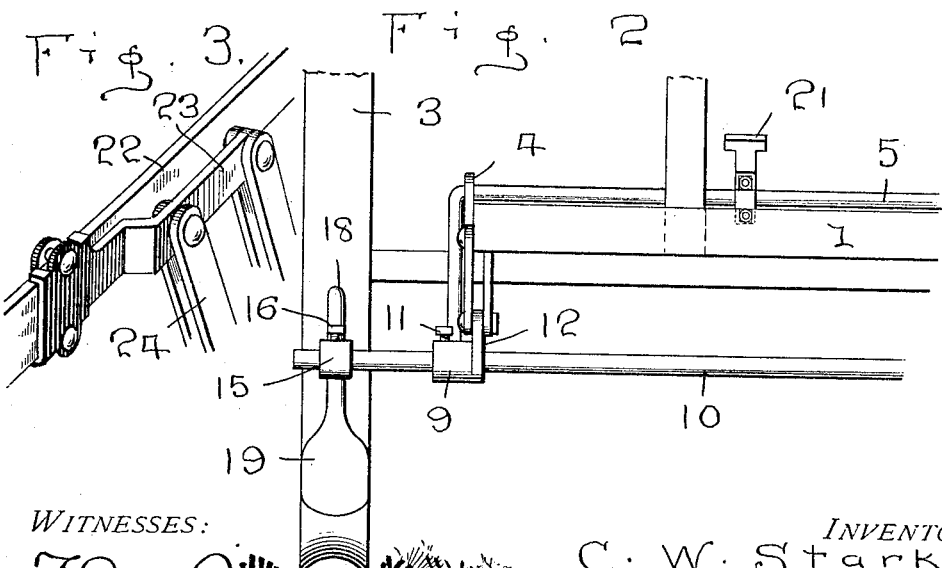
WITNESSES:
INVENTOR
C. W. Stark
BY
W. J. FitzGerald & Co.
Attorneys

UNITED STATES PATENT OFFICE.

CHARLES W. STARK, OF MOUNTAIN LAKE, MINNESOTA.

WHEEL-SCRAPER.

No. 913,576.   Specification of Letters Patent.   Patented Feb. 23, 1909.

Application filed May 26, 1908. Serial No. 435,019.

*To all whom it may concern:*

Be it known that I, CHARLES W. STARK, a citizen of the United States, residing at Mountain Lake, Minnesota, in the county of Cottonwood and State of Minnesota, have invented certain new and useful Improvements in Wheel-Scrapers; and I do hereby declare the following to be a full, clear, and exact description of the invention, such as will enable others skilled in the art to which it appertains to make and use the same.

This invention relates to new and useful improvements in wheel scrapers and it is an object of the invention to provide a novel device of this character wherein the peripheries of the wheels are engaged at a point in close proximity to the contacting surfaces. This arrangement is most essential, especially when employed in conjunction with corn planters.

It is a well known fact that in planting corn the seed is shallow and it often happens that when the planters pass over the rows the corn is greatly displaced owing to the soil sticking to the wheels of the planter. By having the scrapers positioned adjacent the contact of the wheels with the soil it will be readily seen that the soil is returned to approximately its original position.

It is also an object of the invention to provide a novel device of this character which is normally held away from the wheels, but can be placed in engagement therewith by foot pressure.

It is also an object of the invention to provide a novel device of this character wherein the various scrapers for the different wheels are rotated simultaneously.

It is also an object of the invention to provide a novel device of this character wherein the scrapers can be adjusted one with relation to the other in order to be used in conjunction with planters of various widths.

It is also an object of the invention to provide a novel device of this character wherein the normal position of the scrapers with relation to the wheels may be adjusted.

It is also an object of the invention to provide a novel device of this character which will be simple in construction, efficient and advantageous in practice and comparatively inexpensive to manufacture.

With the above and other objects in view the invention consists of the details of construction and in the novel arrangement and combination of parts to be hereinafter more particularly referred to.

In describing the invention in detail reference will be had to the accompanying drawings forming part of this specification wherein like characters of reference denote corresponding parts in the several views, and in which, Figure 1 is a view in side elevation of a corn planter frame showing the invention applied, its contacting position being indicated by dotted lines. Fig. 2 is a fragmentary view in rear elevation of Fig. 1. Fig. 3 is an enlarged fragmentary view in perspective illustrating a modified form of invention.

In the drawings 1 denotes the frame of a planter carried by the supporting axle 2, said axle 2 having mounted thereon supporting wheels 3. Mounted in brackets 4 carried by the sides of the frame and positioned slightly to the rear of the axle 2 is a shaft 5, extending laterally of the frame 1 and terminating in depending crank portions 6. The free end of each crank portion 6 is pivotally engaged by one end of a lever 7, the opposite end of said lever being pivotally secured to an arm 8 projecting inwardly from a casting 9, held to a cross arm 10 by a set screw 11. The arm 8 is engaged by the lever 7 adjacent its junction with the casting 9. The casting 9 is provided with a second arm 12 projecting in a direction opposite to the arm 8, but in alinement therewith. The free ends of the arms 8 and 12 are pivotally engaged by the lower ends of links 13 which have their opposite ends pivotally secured to the frame 1, the pivotal engagement of the link 13 of the arm 8 being slightly in advance of the arm 8, while the pivotal engagement of the link 13 of the arm 12 is slightly in advance of said arm 12 when said arms are in their normal position. The said arms are held in their normal position, or away from the wheels 3 by a contraction spring 14 secured at one end of the frame 1, while its opposite end is secured to the inner link 13 adjacent its connection with the arm 8.

The cross bar 10 projects beyond each of the castings 9, and said projected portions have slidably mounted thereon heads 15 which are held against undue movement on the bar 10 by the set screw 16. The head 15 has an inwardly projected portion 17 provided with a vertical bore through which passes the shank 18 of a scraper blade 19, which is arranged on a curve towards the wheel 3.

It is thought to be apparent that under normal conditions the blades 19 are held away from the wheels 3, but when an inward movement is imparted to the cranks 6 the free ends or the lower ends of the blades are caused to contact with the wheels 3 adjacent their contact with the soil. It is to be observed that the shank 18 may be adjusted vertically with relation to the projected portion 17, and that it is held in such adjusted position by the set screw 20.

The shaft 5 intermediate the sides of the frame 1 is provided with a rearwardly projecting foot lever 21. This lever is so placed as to be readily operated by the foot of a driver occupying the seat 22, as is believed to be apparent. It is also believed to be well to state that the links 13 are arranged in pairs, the links of each pair being parallel and engaging opposite sides of the frame 1 and of the arms 8 and 12 to which they may be applied.

In Fig. 3 a modified detail is shown whereby the position of the upper pivots of the links may be adjusted with relation to their connection to the arms. This is done in order that the movement of the scraper blades with relation to the wheels may be adjusted. In this form the frame 22 is engaged by an end of a bracket 23, and it is to this bracket 23 which is arranged parallel with the frame 22 that the links 24 are connected. The engagement of the brackets 23 with the frame 1 may be as desired, it being only necessary that the brackets 23 may be adjusted longitudinally of the frame.

I claim:

In a device of the character described, scrapers, a carrying bar for said scrapers, means for actuating said scraper-carrying bar, opposed arms, in pairs, fixed to said scraper-carrying bar, pivoted links pivotally connected to said arms, their upper pivoting points being in advance of their pivotal points of connections with said arms, when the scrapers are in normal or initial position, and springs connected to one of each pair of said links for automatically returning said scraper-carrying bar to initial or elevated position.

In testimony whereof I have signed my name to this specification in the presence of two subscribing witnesses.

CHARLES W. STARK.

Witnesses:
ABR. JANZEN,
C. C. WIEBE.